(No Model.)
S. BENSON.
JOURNAL BOX.
No. 276,756. Patented May 1, 1883.
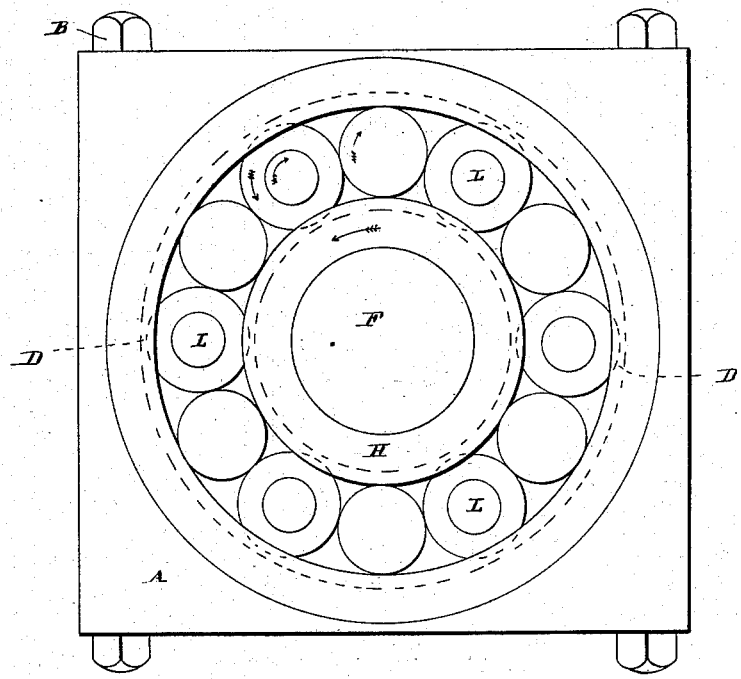
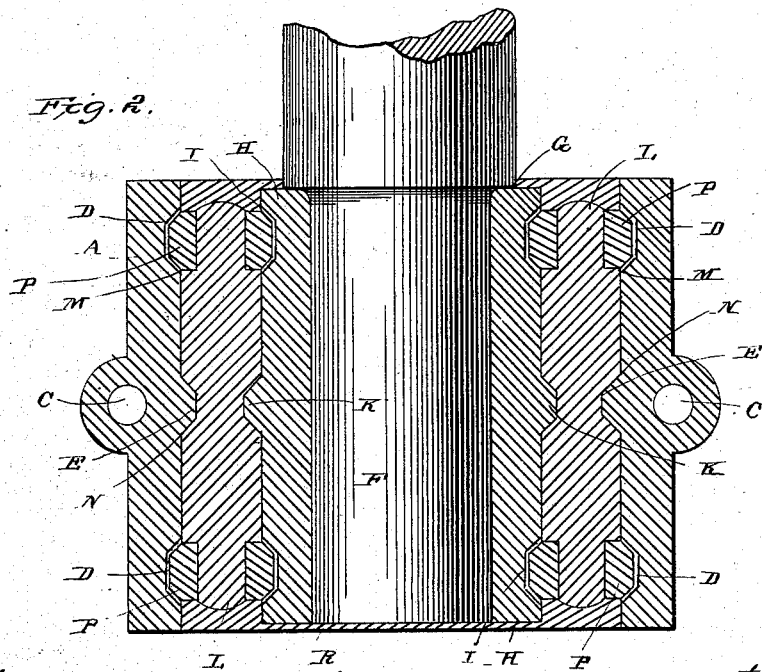
Witnesses.
Edwin L. Yewell,
H. A. Toulmin
Inventor.
Samuel Benson.
C. M. Alexander
Attorney

UNITED STATES PATENT OFFICE.

SAMUEL BENSON, OF EVANSTON, WYOMING TERRITORY.

JOURNAL-BOX.

SPECIFICATION forming part of Letters Patent No. 276,756, dated May 1, 1883.

Application filed March 21, 1883. (No model.)

*To all whom it may concern:*

Be it known that I, SAMUEL BENSON, a citizen of the United States, residing at Evanston, in the county of Uintah, Wyoming Territory, have invented certain new and useful Improvements in Journal-Boxes, of which the following is a specification, reference being had therein to the accompanying drawings.

This invention relates to certain improvements in journal-boxes; and it has for its objects to provide a continuous rolling motion in the bearing-surfaces of the journal and box to avoid the friction attendant upon the ordinary journals and boxes. The device is particularly intended for use on all heavy bearings or shafts or axles, in order to obviate the heating and cutting of such surfaces. These objects I attain by the means illustrated in the accompanying drawings, in which—

Figure 1 represents an end view of the box with the outer plate removed, and Fig. 2 a longitudinal vertical sectional view of the box with the end of the axle in place.

The letter A indicates the axle-box, which is constructed in two parts secured together by means of bolts B, which pass through suitable apertures, C, in the said parts. On the interior of the said box, near each end, are formed annular grooves D, for the purpose hereinafter described, and about midway between the ends with an annular bead, E.

The letter F indicates the axle, which is shouldered at G, and is provided with a bushing, H, which is provided with similar grooves, I, and a bead, K, on the outside.

The letter L indicates a series of rollers alternately shouldered near their ends, as indicated by the letter M, and provided with annular grooves, N, for the purpose hereinafter set forth. The rollers are located in the annular space between the bushing and the interior of the box, being held therein against endwise movement by the internal beads, E, which fit in the annular grooves N of said rollers. The shouldered ends of the alternate rollers have fitted on them the spacing-rollers P, which set within and free from the annular grooves between the interior of the box and the bushing of axle-journal. The box at the ends is provided with annular heads R, which serve to confine the lubricant within the space between the bushing and the interior of the axle-box.

The box when applied to a car-truck is held between the usual supports. When employed for journaling shafting it is supported by suitable hangers or by means of suitable pillow-blocks.

It will be perceived that the rollers travel loosely in the annular space, which is of sufficient width for the purpose, so that while the main roller travels in one direction the end or spacing-rollers will travel in an opposite direction, as indicated by the arrows. The object of the rollers P is to keep the rollers L the proper relative distances apart.

In some cases the bushing may be put on at one end of the shaft and moved along to the opposite end, the shaft in this instance being the same diameter from end to end. The box may be located anywhere between the ends of the shaft.

Having thus described my invention, what I claim, and desire to secure by Letters Patent, is—

The combination, in a journal-box, of the two connected parts provided with annular grooves and a bead on the interior, as described, of the main roller having a bushing or an enlargement provided with similar grooves and beads, the interposed rollers, the anti-friction wheels, and the annular heads, the whole constructed and arranged substantially as and for the purposes specified.

In testimony whereof I affix my signature in presence of two witnesses.

SAMUEL BENSON.

Witnesses:
C. M. WHITE,
L. H. ZASTROW.